Feb. 23, 1954  C. W. SWEENEY  2,669,958
WELDER'S WORK-HOLDING APPLIANCE
Filed April 18, 1951
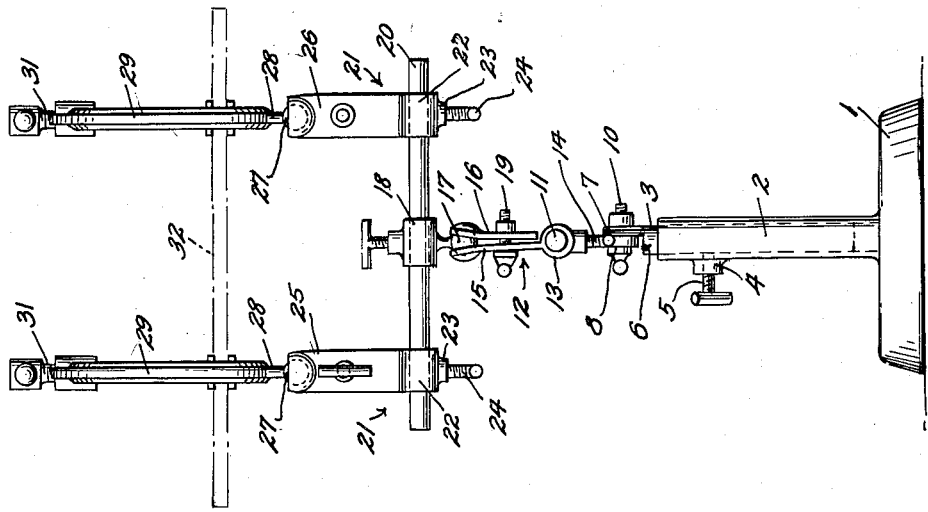
INVENTOR
Charles W. Sweeney
BY *W. S. McDowell*
ATTORNEY Patented Feb. 23, 1954

2,669,958

UNITED STATES PATENT OFFICE 2,669,958

WELDER'S WORK-HOLDING APPLIANCE

Charles W. Sweeney, Columbus, Ohio, assignor of fifteen per cent to Joseph R. Hague, Columbus, Ohio Application April 18, 1951, Serial No. 221,589

2 Claims. (Cl. 113—104)

This invention relates to adjustable work-holding apparatus, the general object thereof being to provide apparatus for maintaining adjoining regions of variously shaped metallic bodies in desired relative order to facilitate welding operations thereon.

In general welding operations, such as those encountered in the repair or restoration of damaged motor vehicle bodies, wheel fenders, and other metallic sheets or parts, the same offer many different shapes or formations and constitute a shop problem of considerable importance in providing adequate and effective holding means for maintaining the parts in proper relative order. It is necessary that a welder have free use of his hands in performing welding operations, in order to manipulate with required dexterity the necessary welding tools and to enable the welder to follow intricate welding patterns. In this connection, various makeshift jigs or work holders are often used for particular operations, but so far as I am aware, no work-holding devices are presently available sufficiently universal in their design to receive and securely support the great majority of the variously shaped and proportioned metallic bodies which are encountered daily in welding shop practice.

Accordingly, it is a leading object of the present invention to provide a welder's work-holding appliance which includes a pair of relatively adjustable work-engaging clamps, and wherein provision is made for supporting said clamps in a manner providing for universal swinging movement thereof in a relatively independent manner or in bodily unison about upper and lower sets of universal mountings.

It is another object of the invention to provide a work-holding appliance of the character set forth wherein the clamp-supporting upper and lower sets of universal mountings are themselves mounted in relative adjustment with respect to each other or bodily in unison, so that the mountings may be raised or lowered turned about both vertical and horizontal axes and adjusted longitudinally with respect to each other on the improved supporting means.

With these and other objects and advantages in view, which will appear as the description proceeds, the invention consists in the novel features of construction, combinations of elements and arrangements of parts, all hereinafter more fully described and pointed out in the appended claims.

In the accompanying drawings:

Fig. 1 is a side elevational view of an adjustable welder's work-holding appliance having the structural features of the present invention;

Fig. 2 is an end elevational view of the appliance.

Referring more particularly to the drawings, the numeral 1 designates the base of my improved work-holding frame. In this instance, the base is formed with an axially disposed upright tubular extension 2, the latter forming a vertical socket for the adjustable reception of a stem 3. The latter may be maintained in various positions of vertical adjustment relative to the extension by providing the latter at one side thereof with a boss 4 containing a threaded bore for the reception of the threaded stem of a set screw, or its equivalent, 5. When the screw is tightened, the inner end of the same engages the outer surface of the stem 3 and exerts sufficient binding effort thereon to hold the extension in a desired vertical position relative to its maximum range of adjustment within the extension.

In this instance, the upper end of the stem 3 is notched as at 6 and formed with a flattened semi-circular head 7. One face of this head is held in contact with a semi-circular flat face provided on a depending web 8 carried by a lower tubular fitting 9. The head 7 and the web 8 are formed with registering openings suitably threaded for the reception of a binding screw 10. Upon the tightening of the screw 10, the head 7 and the web 8 are clamped together in a frictional manner, retaining the fitting 9 in desired positions of adjustment about the horizontal axis of turning movement afforded by the shank of the binding screw 10.

Positioned for longitudinal adjustment within the fitting 9 and held in such position of adjustment by a set screw 9a is the intermediate portion of a lower substantially horizontally extending supporting rod 11. This rod carries for longitudinal adjustment thereon a pair of lower clamping brackets 12. Each of these brackets is formed to include a hub 13 which is longitudinally bored for the reception of the rod 11. The hub 13 of each lower bracket is provided with a threaded opening for the reception of the threaded shank of a set screw 14. When the latter is tightened, the same exerts a binding frictional action on the engaged portion of the rod 11 to hold the bracket or brackets in various positions of relative longitudinal adjustment on the rod 11.

Each of the brackets 12 additionally includes an integral upstanding wing 15 and a separable cooperative clamping plate 16. Toward their upper ends each of the wings 15 and its associated plate 16 is formed with spherical depressions constituting sockets for the reception of the spherical heads 17 which are rigidly carried by and depend from upper tubular fittings 18. Each of the wings 15 and the plates 16 are formed with registering openings suitably threaded for the reception of the shanks of clamping screws 19. When the latter are tightened manually to a given extent, the spherical surfaces of the depressions formed with the wings 15 and the plates 16 exerts sufficient frictional pressure on the heads 17 to hold the fittings 18 in desired positions of universal adjustment with respect to the lower set of clamping brackets 12.

Slidably mounted for longitudinal adjustment in the fittings 18 are transversely extending normally horizontally disposed rods 20. The latter are arranged on opposite sides of the vertical axis of the extension 2 of the frame base and are adjustable toward and away from said vertical axis independently or bodily through the adjustment of the rod 11 in its fitting 9.

Mounted on each of the rods 20 is a pair of upper supporting brackets 21, which are similar in construction to the lower brackets 12. Each of the upper brackets includes a hub 22 formed on its under side with a boss 23. The threaded shank of an adjusting screw 24 is positioned in a threaded bore provided in each of the hubs 22 and its associated boss 23. Arising from each of the hubs 22 is a wing 25 which cooperates with a separable clamping plate 26. Adjacent to their upper ends each of the wings 25 and the plates 26 is formed with a spherical depression for reception between the same of a spherical head 27 provided on the lower end of a short stem 28 carried by and projecting rigidly from the lower end of a C-clamp 29. Each of these clamps (four in number) includes spaced work-receiving jaws 30 and work clamping screws 31, by means of which work pieces shown at 32 are held in connection with the clamps.

In view of the foregoing, it will be seen that by the construction set forth, the clamps 29 may be adjusted to assume a large number of operating positions, depending upon the configuration of the work pieces engaged thereby. In the drawings, these work pieces are shown as of simple plate-like form. However, it will be understood that in practice, the shape and dimensions of these work pieces will differ greatly, and it is to adapt the clamps to such variations in shape that the present invention has been conceived and developed. Thus, the clamps may turn about the universal adjustments afforded by the upper set of ball and socket connections indicated at 25, 26 and 27 which are comparatively close to the bodies of the clamps 29. A greater range of adjustment is afforded by the lower ball and socket connections provided by the members 15, 16 and 17. The entire supporting assembly may turn about the horizontal axis of the clamping bolt 10 provided between the fitting 9 and the upper end of the stem 3. Also, the clamps may be bodily raised and lowered by the vertical adjustment of the stem 3 in the upright extension 2. Each pair of clamps may be moved toward or away from each other by longitudinal adjustment on the upper set of rods 20 or similar adjustment on the lower rod 11. Through these multiple or compound adjustments, the clamps may be moved relative to each other to assume the most advantageous clamping positions with the work pieces engaged thereby, holding adjoining edge portions of such work pieces in desired relative order during the completion of the welding operation.

I claim:

1. Welder's workpiece clamping apparatus comprising a base, a vertically adjustable stem arising from said base, securing means maintaining said stem in various positions of vertical adjustment with respect to said base, a lower tubular fitting, a horizontal pivot connection uniting said stem and fitting, fastening means operative to maintain said fitting in various positions of adjustment about its pivotal connection with said stem, a lower supporting rod slidably carried by said fitting for longitudinal and rotative adjustment with respect thereto, a lower pair of spaced upstanding clamping brackets slidably mounted on said rod for relative longitudinal and rotative adjustment thereon, a pair of upper tubular fittings, an upper supporting rod mounted for longitudinal and rotative adjustment in each of said upper fittings, a ball and socket connection uniting each of said upper fittings with one of said clamping brackets, a pair of upper clamping brackets mounted for relative longitudinal and rotative adjustment on each of said upper supporting rods, each of said upper clamping brackets including a wing and a separable plate formed with registering socket-providing depressions, a plurality of work-engaging clamps, each of said clamps including a rigid angularly and downwardly projecting stem formed at its lower end with a spherical head, the head of each of said stems being adjustably received in the wing and plate depressions of said upper brackets, means for adjustably clamping the plate of each of said upper brackets to the complemental wing thereof in holding an associated clamp in adjusted positions relative to the upper bracket carrying the same.

2. Work-clamping apparatus, comprising: a base formed with a vertically disposed socket, a stem positioned in said socket for vertical adjustment, clamping means for maintaining said stem in its various positions of vertical adjustment in said socket, a lower fitting member, a horizontal pivotal connection uniting said lower fitting member with the upper end of said stem, clamping means for maintaining said fitting member in its various positions of adjustment about its horizontal axis of turning movement provided by said pivot connection, a lower supporting rod slidably carried by said fitting member for longitudinal and rotative adjustment with respect thereto, clamping means carried by said fitting member for maintaining said rod in its various positions of adjustment with respect to said fitting member, a lower pair of spaced upstanding clamping brackets slidably mounted on said rod for relative longitudinal and rotative adjustment thereon, clamping means carried by said brackets for maintaining the same in their various positions of adjustment on said supporting rod, a pair of upper fitting members, ball and socket connections uniting each of said upper fitting members with the upper end of an associated clamping bracket, an upper supporting rod mounted for longitudinal and rotative adjustment in each of said upper fitting members, means for maintaining each of said upper supporting rods in its various positions of adjustment in each of said upper fitting members, a pair of upper clamping brackets mounted for relative longitudinal and rotative adjustment on each of said upper supporting rods, means for maintaining said upper clamping brackets in their various positions of adjustment on each of said upper supporting rods, each of said upper brackets including a wing and a separable plate formed with registering socket-providing depressions, a plurality of work-engaging C-clamps, each of said clamps including a rigid angularly and downwardly projecting stem formed with a spherically headed lower end, the head of each of said stems being adjustably received in the wing and plate depressions of said upper brackets, and means for adjustably clamping the plate of each of said upper brackets to the complemental wing in holding an associated clamp in adjusted positions relative to the upper bracket carrying the same.

CHARLES W. SWEENEY.

References Cited in the file of this patent

UNITED STATES PATENTS

| Number | Name | Date |
| --- | --- | --- |
| 459,637 | Lee | Sept. 15, 1891 |
| 546,421 | Duke | Sept. 17, 1895 |
| 593,139 | Thomas | Nov. 2, 1897 |
| 695,625 | Roach | Mar. 18, 1902 |
| 783,031 | Fell | Feb. 21, 1905 |
| 1,013,711 | Wiggins | Jan. 2, 1912 |
| 1,084,130 | Cargin | Jan. 13, 1914 |
| 1,323,127 | Treuthardt | Nov. 25, 1919 |
| 1,386,318 | Cowan | Aug. 2, 1921 |
| 1,486,481 | Cole | Mar. 11, 1924 |
| 1,670,253 | Gilbert | May 15, 1928 |
| 2,019,789 | Mahannah | Nov. 5, 1935 |
| 2,324,803 | Snyder | July 20, 1943 |

FOREIGN PATENTS

| Number | Country | Date |
| --- | --- | --- |
| 190,779 | Switzerland | May 15, 1937 |